United States Patent
Kim et al.

(10) Patent No.: US 9,299,005 B2
(45) Date of Patent: Mar. 29, 2016

(54) IMAGE PROCESSING APPARATUS AND METHOD

(71) Applicant: SAMSUNG ELECTRONICS CO., LTD., Suwon-si, Gyeonggi-do (KR)

(72) Inventors: Chang-won Kim, Gwangju-si (KR);
Won-seok Ahn, Yongin-si (KR);
Jin-woo Jeong, Seoul (KR);
Seung-hoon Han, Seoul (KR);
Young-seok Han, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 105 days.

(21) Appl. No.: 14/015,054

(22) Filed: Aug. 30, 2013

(65) Prior Publication Data

US 2014/0064625 A1 Mar. 6, 2014

(30) Foreign Application Priority Data

Sep. 5, 2012 (KR) .................. 10-2012-0098136

(51) Int. Cl.
*G06K 9/46* (2006.01)
*G06K 9/48* (2006.01)
*G06T 7/00* (2006.01)

(52) U.S. Cl.
CPC ............. *G06K 9/48* (2013.01); *G06T 7/0083* (2013.01); *G06T 2207/20096* (2013.01); *G06T 2207/20136* (2013.01)

(58) Field of Classification Search
None
See application file for complete search history.

(56) References Cited

U.S. PATENT DOCUMENTS

| 5,396,584 | A | | 3/1995 | Lee et al. |
| 5,469,850 | A | * | 11/1995 | Iizuka et al. .................. 600/443 |
| 5,604,820 | A | * | 2/1997 | Ono .............................. 382/190 |
| 5,617,487 | A | * | 4/1997 | Yoneyama et al. ........... 382/199 |
| 5,680,471 | A | * | 10/1997 | Kanebako et al. ............ 382/128 |
| 7,110,583 | B2 | * | 9/2006 | Yamauchi ..................... 382/128 |
| 7,834,305 | B2 | * | 11/2010 | Hagio et al. .............. 250/214 R |
| 8,019,177 | B2 | | 9/2011 | Rother et al. |
| 8,194,134 | B2 | * | 6/2012 | Furukawa ..................... 348/169 |

(Continued)

FOREIGN PATENT DOCUMENTS

| KR | 10-2008-0021181 | 3/2008 |
| KR | 10-2008-0111376 | 12/2008 |
| WO | WO 2007/016301 | 2/2007 |

OTHER PUBLICATIONS

Computer English Translation Japanese Patent No. 09-270015, pp. 1-13, publication Date: Oct. 1997.*
European Search Report issued Dec. 18, 2013 in corresponding European Application No. 13181905.4.
Mortensen et al. "Interactive Segmentation with Intelligent Scissors" CVGIP Graphical Models and Image Processing vol. 6, No. 5. Sep. 1998, pp. 349-384.

(Continued)

*Primary Examiner* — Daniel Mariam
(74) *Attorney, Agent, or Firm* — Staas & Halsey LLP

(57) ABSTRACT

An image processing apparatus and method include a receiver configured to receive an image, a display configured to display the received image, an extractor configured to extract a first object contour by applying a preset algorithm to an area of the displayed image designated by a user and extract a second object contour based on the designated area, an image analyzer configured to analyze the displayed image, and a controller configured to determine weight values for the first and second object contours based on an analysis result of the image analyzer and extract an object contour based on the first and second object contours to which the determined weight values are applied. The image processing apparatus extracts an object intended by a user even in a heavily noisy image.

20 Claims, 6 Drawing Sheets

(56) References Cited

U.S. PATENT DOCUMENTS

| | | |
|---|---|---|
| 2003/0095710 A1 | 5/2003 | Tessadro |
| 2006/0221090 A1 | 10/2006 | Takeshima et al. |
| 2008/0317351 A1 | 12/2008 | Fenchel et al. |
| 2009/0122082 A1* | 5/2009 | Heron .......................... 345/629 |
| 2009/0129700 A1 | 5/2009 | Rother et al. |
| 2010/0182401 A1 | 7/2010 | Yoon et al. |

OTHER PUBLICATIONS

Malik et al. "Contour and Texture Analysis for Image Segmentation" International Journal of Computer Vision vol. 43, No. 1. Jan. 2001, pp. 7-27.

Li et al. "A Contour-Based Approach to Multisensor Image Registration" IEEE Transactions on Image Processing vol. 4, No. 3 Mar. 1995, pp. 320-334.

* cited by examiner (a)           (b)

(a)           (b)

IMAGE PROCESSING APPARATUS AND METHOD

CROSS-REFERENCE TO RELATED APPLICATIONS

This application claims priority from Korean Patent Application No. 10-2012-0098136, filed on Sep. 5, 2012, in the Korean Intellectual Property Office, the disclosure of which is incorporated herein by reference in its entirety.

BACKGROUND

1. Field

Apparatuses and methods consistent with one or more exemplary embodiments relate to an image processing apparatus and method, and more particularly, to an image processing apparatus and method for extracting an object of an image closest to a user's intention.

2. Description of the Related Art

Existing image processing apparatuses apply various algorithms to automatically extract an object for an area of an image, which is being displayed on a screen, defined by a user. For example, there may be typical examples such as "Sobel Edge Detector", "Active Contour", and the like as algorithms which extract an edge or a boundary value.

However, when the object for the area of the image, which is being displayed on the screen, defined by the user is automatically extracted or the object is not distinct from a background (noise, low illumination, and complicated panoramic view/background), an object area intended by the user and another object area are extracted.

Therefore, there is a need for extracting an object area closest to an object area intended by the user through existing algorithms even when an object is not distinct from a background.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments relate to extracting an object contour closest to a user's intention from an image being displayed.

According to an aspect of one or more exemplary embodiments, there is provided an image processing apparatus. The image processing apparatus may include: a receiver configured to receive an image; a display configured to display the received image; an extractor configured to extract a first object contour by applying a preset algorithm to an area of the displayed image designated by a user and extract a second object contour based on the designated area; an image analyzer configured to analyze the displayed image; and a controller configured to determine weight values for the first and second object contours based on an analysis result of the image analyzer and extract an object contour based on the first and second object contours to which the determined weight values are applied.

The controller may calculate a degree of reliability of the first object contour based on the analysis result of the image analyzer and determine a first weight value, which is to be assigned to the first object contour, and a second weight value, which is to be assigned to the second object contour, based on the calculated degree of reliability.

The controller may calculate degrees of reliability for local areas of the first object contour, determine first weight values, which are to be assigned to the local areas, to be proportional to the calculated degrees of reliability for the local areas, and determine a first weight value for a corresponding local area as a maximum value when a corresponding degree of reliability for the corresponding local area among the calculated degrees of reliability for the local areas is equal to or larger than a preset threshold value.

The controller may determine second weight values, which are to be assigned to local areas of the second object contour, based on the first weight values which are to be assigned to the local areas of the first object contour. The second weight values for the local areas of the second object contour may be inversely proportional to the first weight values for the local areas of the first object contour.

The image analyzer may detect at least one among color, brightness, an edge, and distributed information for each local area constituting at least one of the displayed image and the first object contour. The controller may calculate the degrees of reliability for the local areas constituting the first object contour based on a detection result.

The image processing apparatus may further include a user interface configured to receive a user command. The controller may designate the area according to the user command received through the user interface.

The controller may determine local areas corresponding to each other among the local areas constituting the first and second object contours based on at least one of a pixel value and a position for each local area constituting the first object contour and at least one of a pixel value and a position for each local area constituting the second object contour.

The controller may extract the object contour using the following equation when the local areas corresponding to each other among the local areas constituting the first and second object contours are determined. $(x,y)_{OC} = (x,y)_{1OC} W(x,y)_{1OC} + (x,y)_{2OC} W(x,y)_{2OC}$, wherein $(x,y)_{1OC}$ may be the local area of the first object contour, $W(x,y)_{1OC}$ may be the first weight value which is assigned to the local area of the first object contour, $(x,y)_{2OC}$ may be the local area of the second object contour, and $W(x,y)_{2OC}$ may be the second weight value which is assigned to the local area of the second object contour.

According to another aspect of one or more exemplary embodiments, there is provided an image processing method which processes an image received in an image processing apparatus. The image processing method may include: displaying the received image; extracting a first object contour by applying a preset algorithm to an area of the displayed image designated by a user and extracting a second object contour based on the designated area; determining weight values for the first and second object contours based on a analysis result of the displayed image; and extracting an object contour based on the first and second object contours to which the determined weight values are assigned.

The determining may include calculating a degree of reliability of the first object contour based on the analysis result and determining a first weight value, which is to be assigned to the first object contour, and a second weight value, which is to be assigned to the second object contour, based on the calculated degree of reliability.

The determining may include calculating degrees of reliability for local areas of the first object contour, determining first weight values, which are assigned to the local areas of the first object contour, to be proportional to the calculated degrees of reliability for the local areas of the first object contour, and setting a first weight value for a corresponding local area as a maximum value when a corresponding degree of reliability for the corresponding local area among the calculated degrees of reliability is equal to or larger than a preset threshold value.

The determining may include determining second weight values, which are to be assigned to local areas of the second object contour, based on the first weight values, which are to be assigned to the local areas of the first object contour, and the second weight values for the local areas of the second object contour may be inversely proportional to the first weight values for the local areas of the first object contour.

The determining may include detecting at least one of color, brightness, an edge, and distributed information for each local area constituting at least one of the displayed image and the first object contour and calculating degrees of reliability for local areas constituting the first object contour based on a detection result.

The image processing method may further include receiving a user command and designating the area according to the received user command.

The extracting may determining local areas corresponding to each other among the local areas constituting the first and second object contours based on at least one of a pixel value and a position for each local area constituting the first and second object contours.

The extracting may include extracting the object contour using the following equation when the local areas corresponding to each other among the local areas constituting the first and second object contours are determined. $(x,y)_{OC}=(x,y)_{1OC}W(x,y)_{1OC}+(x,y)_{2OC}W(x,y)_{2OC}$, wherein $(x,y)_{1OC}$ may be the local area of the first object contour, $W(x,y)_{1OC}$ may be the first weight value which is assigned to the local area of the first object contour, $(x,y)_{2OC}$ may be the local area of the second object contour, and $W(x,y)_{2OC}$ may be the second weight value which is assigned to the local area of the second object contour.

According to the above-described exemplary embodiments, the image processing apparatus may extract an object intended by the user even in a heavily noisy image.

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
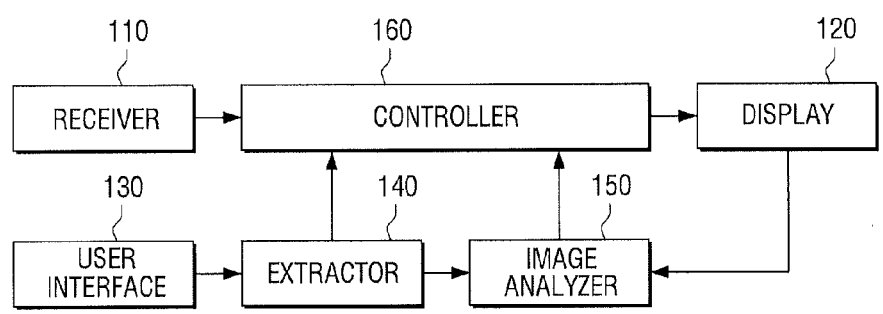
FIG. 1 is a block diagram illustrating an image processing apparatus according to one or more exemplary embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a block diagram illustrating an image processing apparatus according to one or more exemplary embodiments.

Referring to FIG. 1, an image processing apparatus may include a receiver 110, a display 120, a user interface 130, an extractor 140, an image analyzer 150, and a controller 160.

The receiver 110 may receive an image and display the image received through the receiver 110. Specifically, the receiver 110 may receive image data from an external server. When the image data is received from an external server, the receiver 110 may be implemented to include components such as a tuner, a demodulator, an equalizer, a decoder, and the like, for example. The respective components included in the receiver 110 are known techniques and thus description of operations for the respective components will be omitted here. Further, the receiver 110 may receive the image data through a source apparatus such as a web server through at least one of a SCART interface, an audio video (AV) interface, a high-definition multimedia interface (HDMI), a COMPONENT interface, and a universal serial bus (USB) interface or through a reproducing apparatus such as a digital versatile disc (DVD), for example. When the image data is received through the receiver 110, the display 120 may display an image image-processed through a signal processor (not shown).

The user interface 130 may receive the user command from the user and the user command may be a command for designating a specific area of the image displayed through the display 120. The user interface 130 may be implemented, for example, with various types such as a touch screen implemented on the display 120, various input buttons provided in a body of the image processing apparatus, a keyboard connected to the image processing apparatus, and an input/output (I/O) interface configured to receive various input signals from an external input unit such as a mouse. When the user command is received through the user interface 130, the controller 160, which is to be described later, may designate an area of the image, which is displayed through the display 120, corresponding to the received user command.

The extractor 140 may extract a first object contour by applying a preset algorithm to the area designated by the user among the image displayed through the display 120 and may extract a second object contour based on the area designated by the user. Here, the algorithm applied to extract the first object contour for the area designated by the user may be a known algorithm. The second object contour extracted based on the area designated by the user may be an area corresponding to the area designated by the user. That is, the second object contour may be an area drawn by the user among the image being displayed through the display 120. Therefore, the extractor 140 may automatically extract the first object contour related with the area designated by the user using the preset algorithm and further manually extract the second object contour corresponding to the area designated by the user.

The image analyzer 150 may analyze the image displayed through the display 120. In some cases, the image analyzer 150 may perform analysis on an image corresponding to the area designated by the user among the image displayed through the display 120. However, the inventive concept is not limited thereto and the image analyzer 150 may analyze the whole image displayed through the display 120. Specifically, the image analyzer 150 may detect at least one of color, brightness, an edge, and distributed information for each local area constituting at least one among the image displayed through the display 120 or the image of the displayed image corresponding to the area designated by the user and the first object contour automatically extracted by the algorithm.

The controller 160 may determine a weight value for the first object contour automatically extracted by the algorithm based on the analysis result of the image analyzer 150 and a weight value for the second object contour manually extracted. Then, the controller 160 may extract an object contour based on the first object contour and the second object contour to which the weight values may be applied. Here, the object contour extracted based on the first and second object contours, to which the weight values are applied, may be a new object contour in which a user's intention is considered.

Specifically, the controller 160 may calculate a degree of reliability of the first object contour automatically extracted by the algorithm based on the analysis result of the image analyzer 150. Next, the controller 160 may determine a first weight value which is to be assigned to the first object contour and a second weight value which is to be assigned to the second object contour based on the calculated degree of reliability of the first object contour. More specifically, the controller 160 may calculate the degrees of reliability for local areas of the first object contour automatically extracted by the algorithm based on the analysis result of the image analyzer 150. Next, the controller 160 may determine first weight values, which are to be assigned to the local areas of the first object contour, to be proportional to the calculated degrees of reliability for the local areas of the first object contour. At this time, the controller 160 may set a first weight value for a corresponding local area as a maximum value when a degree of reliability of at least one local area among the calculated degrees of reliability for the local areas constituting the first object contour is equal to or larger than a threshold value.

First, the controller 160 may calculate the degrees of reliability for the local areas of the first object contour automatically extracted through the following exemplary embodiments. In one or more exemplary embodiments, the controller 160 may calculate the degrees of reliability for the local areas constituting the first object contour according to distance differences between edge information for the local areas constituting the image detected through the image analyzer 150 and pixel position information for the local areas of the first object contour automatically extracted by the algorithm. For example, a storage unit (not shown) may store the degrees of reliability having a level in a range of from 0 (zero) to 1 according to the distance difference between preset two pieces of information. Therefore, the controller 160 may calculate the degrees of reliability corresponding to the calculated distance differences for the local areas constituting the first object contour with reference to the level of the degree of reliability stored in the storage unit (not shown). That is, a degree of reliability of a local area having a large distance difference among the local areas constituting the first object contour may be close to the level of 0 (zero) and a degree of reliability of a local area having a small distance difference is may be close to the level of 1.

In one or more exemplary embodiments, the controller 160 may calculate the degrees of reliability for the local areas constituting the first object contour by comparing color or brightness information of the local areas constituting the first object contour with color or brightness information of a periphery. For example, the storage unit (not shown) may store the degrees of reliability having a level in a range of from 0 (zero) to 1 according to a preset color or brightness difference. Therefore, the controller 160 may calculate the degrees of reliability corresponding to differences between the color or brightness for the local areas constituting the first object contour and the color or brightness of the periphery with reference to the level of the degrees of reliability stored in the storage unit (not shown). That is, a degree of reliability of a local area having a small color or brightness difference among the local areas constituting the first object contour may be close to the level of 0 (zero) and a degree of reliability of a local area having a large color or brightness difference may be close to the level of 1.

When the degrees of reliability for the local areas constituting the first object contour are calculated as described above, the controller 160 may determine the first weight values, which are to be assigned to the local areas of the first object contour, to be proportional to the degrees of reliability calculated for the local areas of the first object contour. When at least one degree of reliability among the degrees of reliability calculated for the local areas constituting the first object contour is equal to or larger than a preset threshold value, the controller 160 may set a first weight value for a corresponding local area as a maximum value. As described above, for example, the level of the degree of reliability may be set in a range of from 0 (zero) to 1 and the preset threshold value may be set within the preset level of the degree of reliability. When the level of the degree of reliability is equal to or larger than the preset threshold value, the maximum value of the first weight value may be set to 1. When the level of the degree of reliability of 0.7 is set as the preset threshold value, the first weight for a local area, in which the level of the degree of reliability is equal to or larger than 0.7, among the local areas constituting the first object contour may be 1.

As described above, when the first weight values, which are to be assigned to the local areas constituting the first object contour, are set, the controller 160 may determine second weight values, which are to be assigned to local areas of the second object contour, based on the first weight values for the local areas previously set. Here, the second weight values, which are to be assigned to the local areas of the second object contour, may be inversely proportional to the first weight values for the local areas of the first object contour. That is, as described above, a local area having a high first weight value among the local areas constituting the first object contour is an area having a high degree of reliability and thus it is necessary to a high weight value to a local area of the second object contour corresponding to the corresponding local area having the high degree of reliability. Meanwhile, a local area having a low first weight value among the local areas constituting the first object contour is an area having a low degree of reliability. Thus, a high weight value is assigned to a local area of the second object contour corresponding to the corresponding local area having the low degree of reliability. As one example, when a first weight assigned to one local area among the local areas constituting the first object contour is 0 (zero), a second weight value of a local area of the second object contour corresponding to the one local area may be 1. As another example, when the first weight assigned to one local area among the local areas constituting the first object contour is 1, the second weight value of a local area of the second object contour corresponding to the once local area may be 0 (zero).

As described above, when the first and second weight values for the local areas constituting the first and second object contours are assigned to the local areas constituting the first and second object contours, the controller 160 may extract a new object contour based on the first and second weight values assigned to the local areas of the first and second object contours. Specifically, the controller 160 may determine local areas corresponding to each other among the local areas constituting the first object contour and the local areas constituting the second object contour. That is, the controller 160 may determine the local areas corresponding to each other among the local areas constituting the first and second object contours based on at least one of a pixel value and a position for each local area constituting the first object contour and at least one of a pixel value and a position for each local area constituting the second object contour.

When the local areas corresponding to each other are determined based on the pixel value for each local area constituting the first object contour and the pixel value for each local area constituting the second object contour, the controller 160 may acquire a first value on a mask area including an arbitrary feature point for a specific local area among the local areas constituting the first object contour. Next, the controller 160 may acquire second values on mask areas including arbitrary feature points for the local areas constituting the second object contour. Subsequently, the controller 160 may calculate differences between the first value for the specific local area of the first object contour and the second values of the local areas of the second object contour.

In some cases, the controller 160 may calculate the differences between the first value and the second values using a Sum of the Absolute Difference (SAD) algorithm. When the differences between the first value and the second values are calculated, the controller 160 may acquire a second value having a smallest difference with the first value among the calculated differences. Next, the controller 160 may determine a local area having the second value having the smallest difference among the local areas constituting the second object contour and the local area having the first value on the first object contour as the local areas corresponding to each other.

However, the inventive concept is not limited thereto and the controller 160 may determine a value, which is on a mask area including an arbitrary feature point for a specific local area among the local areas constituting the second object contour as the first value and values, which are on mask areas including arbitrary feature points for the local areas constituting the first object contour as the second values.

Hereinafter, an operation of determining the local areas corresponding to each other based on the pixel values for the local areas constituting the first object contour and the local areas constituting the second object contour will be described in more detail with reference to FIG. 2.

Figure 2:
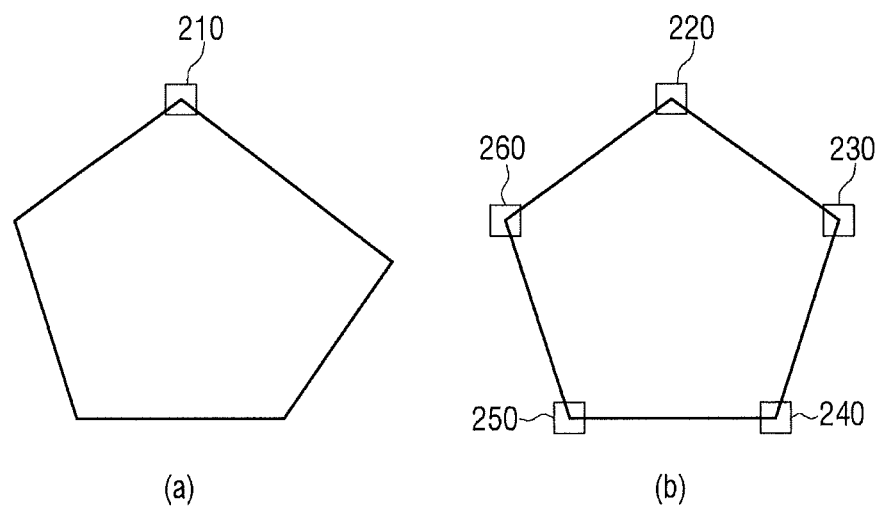
FIG. 2 is an illustrative view explaining an example of determining local areas corresponding to each other based on a pixel value for each local area constituting first and second object contours in an image processing apparatus according to one or more exemplary embodiments.

FIG. 2 is an illustrative view explaining an example of determining local areas corresponding to each other based on pixel values for local areas constituting first and second object contours in the image processing apparatus according to one or more exemplary embodiments.

FIG. 2(*a*) may show a first object contour extracted by applying a preset algorithm and FIG. 2(*b*) may show a second object contour corresponding to an area designated by the user. When the first and second object contours are extracted, the controller 160 acquire a first value, which is on a mask area 210 including an arbitrary feature point for a specific local area among the local areas constituting the extracted first object contour. Further, the controller 160 may acquire second values, which are on mask areas 220 to 260 having arbitrary feature points for the local areas constituting the extracted second object contour. Next, the controller 160 may calculate differences between the first value on the mask area 210 and the second values on the mask areas 220 to 260 and acquire a second value having the smallest difference with the first value among the calculated differences. That is, the controller 160 may acquire the mask area 220 having the smallest difference with the first value of the mask area 210. Therefore, the controller 160 may determine a local area related to the mask area 210 of the first object contour and a local area related to the mask area 220 of the second object contour as the local areas corresponding to each other.

Meanwhile, when the local areas corresponding to each other are determined based on positions for local areas constituting the first object contour and local areas constituting the second object contour, the controller 160 may move an arbitrary feature point for each local area constituting the first object contour to each local area constituting the second object contour. At this time, the controller 160 may move the arbitrary feature points in a vertical direction. When the arbitrary feature points moved in the vertical direction reach corresponding points of the local areas constituting the second object contour, the controller 160 may determine a local area corresponding to a feature point having the smallest moving distance among the arbitrary feature points reached to the corresponding points of the local areas constituting the second object contour and a local area corresponding to a corresponding point met with the corresponding feature point as the local areas corresponding to each other.

However, the inventive concept is not limited thereto and the arbitrary feature points for the local areas constituting the second object contour may be moved to the local areas constituting the first object contour.

Hereinafter, an operation of determining the local areas corresponding to each other based on the positions for the local areas constituting the first object contour and the local areas constituting the second object contour will be described in more detail with reference to FIG. 3.

Figure 3:
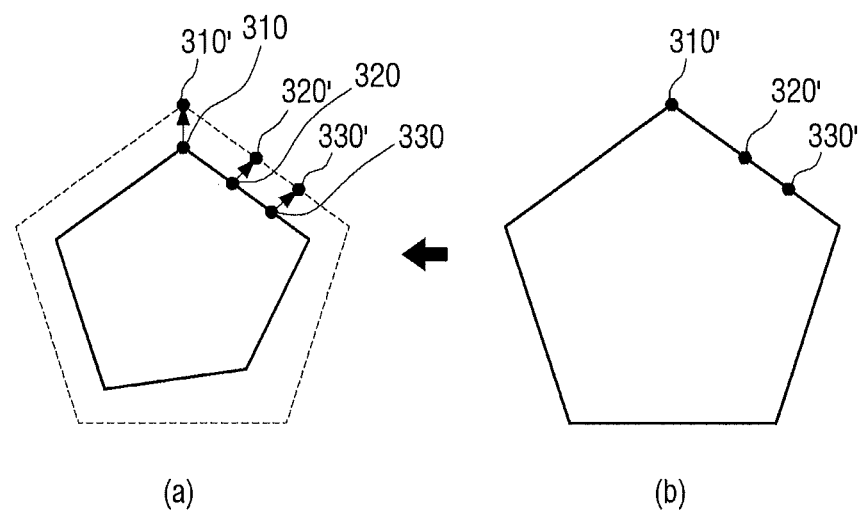
FIG. 3 is an illustrative view explaining an example of determining local areas corresponding to each other based on a position for each local area constituting first and second object contours in an image processing apparatus according to one or more exemplary embodiments.

FIG. 3 is an illustrative view explaining an example of determining local areas corresponding to each other based on positions for local areas constituting first and second object contours in the image processing apparatus according to one or more exemplary embodiments.

FIG. 3(a) may show a first object contour extracted by applying a preset algorithm and FIG. 3(b) may show a second object contour corresponding to an area designated by the user. When the first and second object contours are extracted, the controller 160 may move arbitrary feature points 310, 320 and 330 for local areas constituting the first object contour to local areas constituting the second object contour. At this time, the controller 160 may move the arbitrary feature points in a vertical direction. When the arbitrary feature points moved in the vertical direction reach corresponding points 310', 320', and 330' of the local areas constituting the second object contour, the controller 160 may determine a feature point having the smallest moving distance among the arbitrary feature points 310, 320, and 330 reached to the corresponding points 310', 320', and 330' of the local areas constituting the second object contour. As shown in FIG. 3(a), when the moving distance of the feature point 310 moved to the corresponding point 310' among the feature points 310, 320, and 330 is the shortest, the controller 160 may determine the local area related to the feature point 310 and the local area related to the corresponding point 310' as the local areas corresponding to each other.

When the local areas corresponding to each other among the local areas constituting the first and second object contours are determined based on at least one of the pixel value and the position as described above, the controller 160 may extract a new object contour through sums of the first and second weight values assigned to the local areas of the first and second object contours on the basis of the determined local areas. Specifically, the controller 160 may calculate the sums of the first and second weight values assigned to the local areas of the first and second object contours based on the following Equation 1.

$$(x,y)_{OC} = (x,y)_{1OC} W(x,y)_{1OC} + (x,y)_{2OC} W(x,y)_{2OC}$$ Equation 1 wherein $(x,y)_{1OC}$ may be the local area of the first object contour, $W(x,y)_{1OC}$ may be the first weight value which is assigned to the local area of the first object contour, $(x,y)_{2OC}$ may be the local area of the second object contour, and $W(x,y)_{2OC}$ may be the second weight value which is assigned to the local area of the second object contour.

Therefore, when the local areas corresponding to each other among the local areas constituting the first and second object contours are determined, the controller 160 may calculate the sums of the local areas constituting the first and second object contours, which are corresponding to each other on the basis of the determined local areas, through Equation 1. Subsequently, the controller 160 may calculate the new object contour based on the sums of the weight values of the local areas constituting the calculated first and second object contours.

Figure 4:
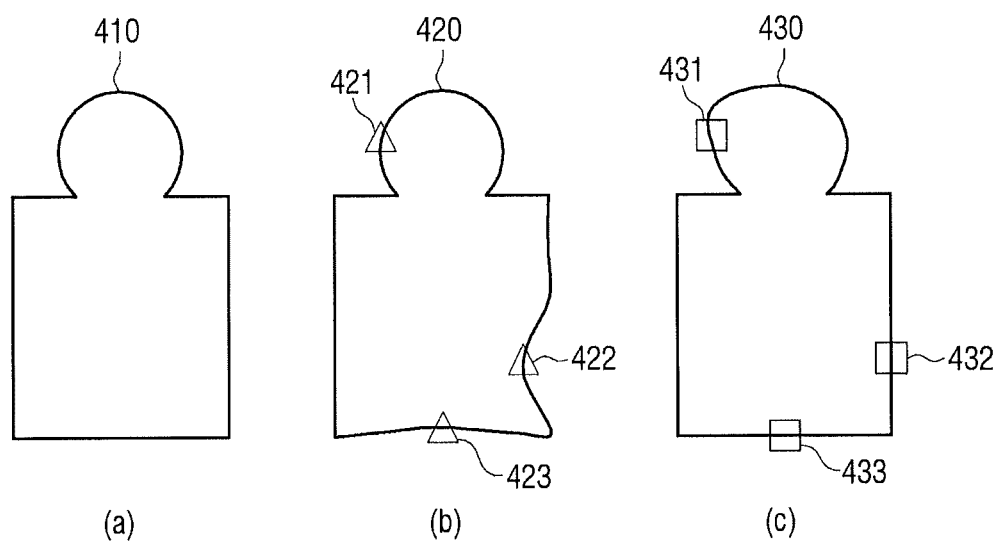
FIG. 4 is an illustrative view explaining an example of extracting first and second object contours in an image processing apparatus according to one or more exemplary embodiments.
Figure 5:
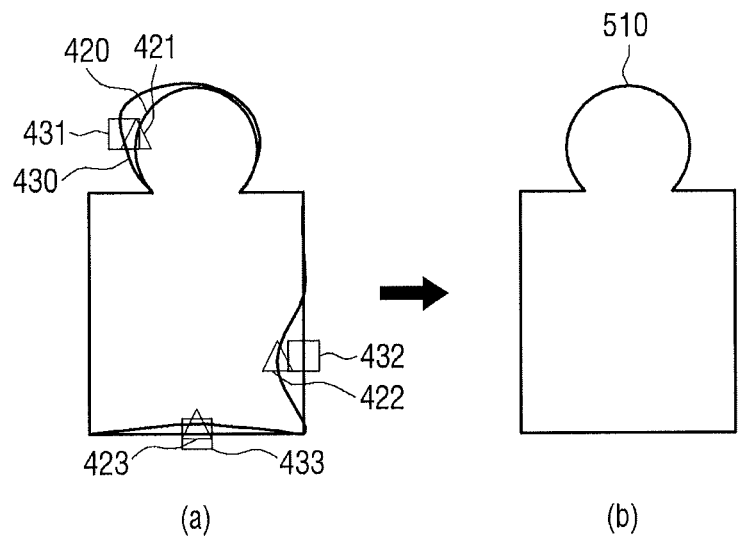
FIG. 5 is an illustrative view explaining an example of extracting a new object contour based on first and second object contours in an image processing apparatus according to one or more exemplary embodiments.

FIG. 4 is an illustrative view explaining an example of extracting first and second object contours in the image processing apparatus according to one or more exemplary embodiments and FIG. 5 is an illustrative view explaining an example of extracting a new object contour based on first and second object contours in the image processing apparatus according to one or more exemplary embodiments.

As shown in FIG. 4(a), the image processing apparatus may display an image 410 received through the receiver 110 through the display 120. While the image 410 is displayed, the user may designate a specific area through a touch screen. When the specific area is designated by the user, the image processing apparatus may extract a first object contour 420 as shown in FIG. 4(b) by applying a preset algorithm on the specific area. Further, the image processing apparatus may manually extract a second object contour 430 as shown in FIG. 4(c) based on the specific area designated by the user. Here, the second object contour 430 is an area drawn by the user through the user interface 130 such as a touch screen.

When the first object contour 420 and the second object contour 430 are extracted based on the area designated by the user as described above, the image processing apparatus may calculate a degree of reliability of the first object contour 420 based on an analysis result of the image analyzer 150. Next, the image processing apparatus may determine first weight values for local areas constituting the first object contour 420 according to the calculated degree of reliability and determines second weight values for local areas constituting the second objet contour 430 based on the first weight values determined for the local areas.

For example, in FIG. 4(b), the degree of reliability of a first local area 421 among the local areas constituting the first object contour 420 may be very high and the degree of reliability of a second local area 422 may be very low. Therefore, the first weight value of the first local area 421 having the high degree of reliability may be 1 and the first weight value of the second local area 422 having a low degree of reliability may be 0 (zero). Meanwhile, in FIG. 4(c), the second weight values for the local areas constituting the second object contour 430 may be inversely proportional to the first weight values for the local areas constituting the first object contour 420. Therefore, the second weight value of a first local area 431, which is related to the first local area 421 of the first object contour 420, among the local areas constituting the second object contour 430 may be 0 (zero) and the second weight value of a second local area 432, which is related to the second local area 422 of the first object contour, may be 1.

When the first and second weight values for the local areas constituting the first and second object contours 420 and 430 are determined as described above, the image processing apparatus may calculate sums of the first and second weight values of the local areas corresponding to each other among the local areas constituting the first and second object contours 420 and 430. For example, as shown in FIG. 5(a), a first local area 421, a second local area 422, and the third local area 423 of a first object contour 420 may correspond to a first local area 431, a second local area 432, and a third local area 433 of the second object contour 430, respectively. In this case, the image processing apparatus may calculate a sum of the first and second weight values for the first local areas 421 and 431, a sum of the first and second weight values for the second local areas 422 and 432, and a sum of the first and second weight values of the third areas 423 and 433. When the sums of the first and second weight values of the local areas corresponding to each other among the local areas constituting the first and second object contours 420 and 430 are calculated as described above, the image processing apparatus may calculate a new object contour 510 from the calculated sums. That is, as shown in FIG. 5(b), the image processing apparatus may calculate the object contour 510 having the closest area to an area desired by the user.

Until now, the operation of extracting the object contour having the closest area to the user's intention through the configuration of the image processing apparatus has been described in detail. Hereinafter, a method of extracting an object contour having the closest area to the user's intention from the received image in the image processing apparatus will be described in detail.

Figure 6:
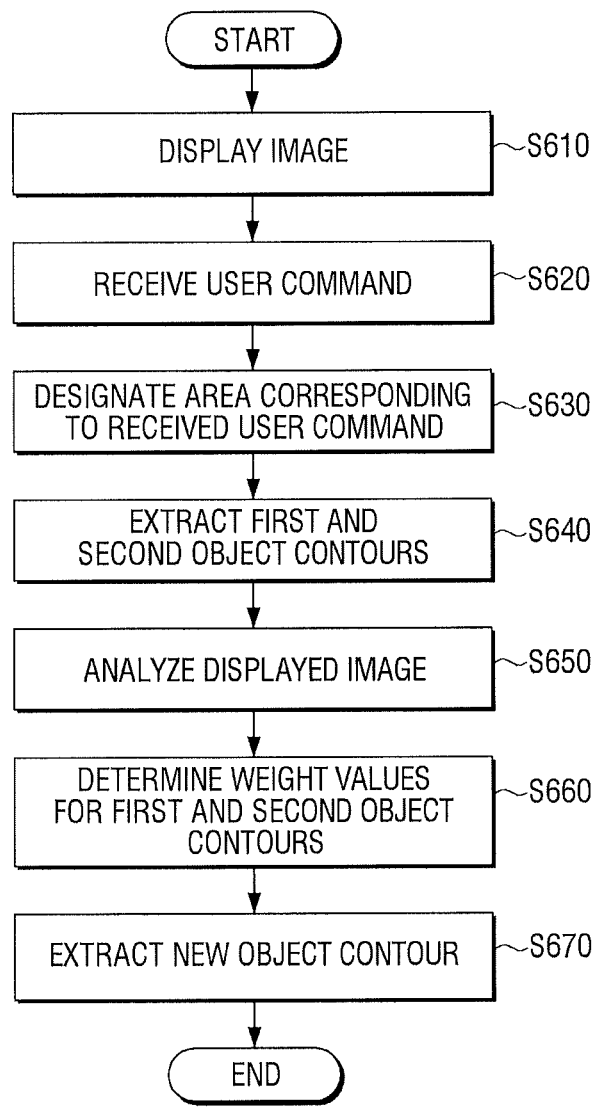
FIG. 6 is a flowchart illustrating a method of performing image-processing on an received image in an image processing apparatus according to one or more exemplary embodiments.

FIG. 6 is a flowchart illustrating a method of performing image-processing on a received image in an image processing apparatus according to one or more exemplary embodiments.

Referring to FIG. 6, the image processing apparatus may display an image received through an external server or a reproducing apparatus such as a digital versatile disc (DVD) (S610). While the image is displayed on a screen, the image processing apparatus receives a user command from the user (S620). Here, the user command may be a command for designating a specific area among the displayed image on the screen. When the user command is received, the image processing apparatus may designate an area corresponding to the received user command (S630). Next, the image processing apparatus may extract a first object contour applying a preset algorithm to the area designated by the user among the displayed image and may extract a second object contour based on the area designated by the user (S640). Here, the algorithm applied to extract the first object contour for the area designated by the user may be a known algorithm. The second object contour extracted based on the area designated by the user may be an area corresponding to the area designated by the user. That is, the second object contour may be an area drawn by the user among the image displayed on a screen.

When the first and second object contours are extracted according to the area designated by the user as described above, the image processing apparatus may analyze the image displayed on the screen (S650). Specifically, the image processing apparatus may detect at least one of color, brightness, an edge, and distributed information for each local area constituting at least one of the image displayed on a screen or the image corresponding to the area designated by the user among the displayed image and the first object contour automatically extracted by the algorithm. Next, the image processing apparatus may determine a weight value for the first object contour automatically extracted by the algorithm based on an analysis result and a weight value for the second object contour manually extracted (S660). Next, the image processing apparatus may extract a new object contour based on the first object contour and the second object contour to which the weight values are applied (S670).

Hereinafter, a method of determining weight values for local areas constituting the first and second object contours in the image processing apparatus will be described in detail.

Figure 7:
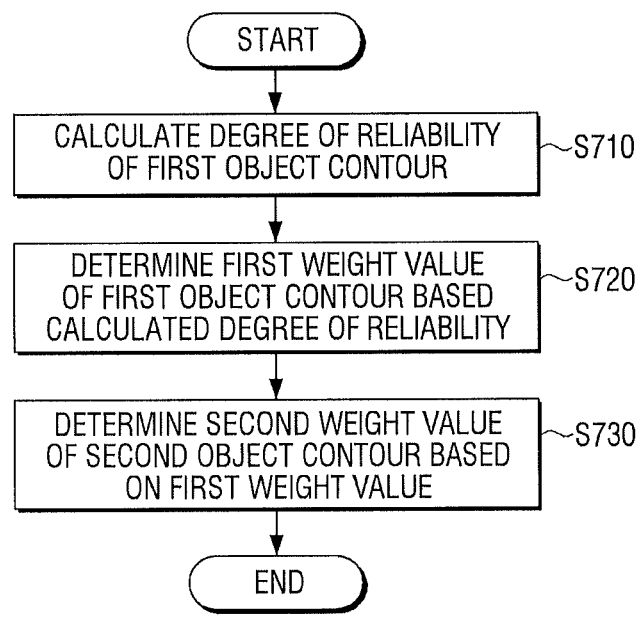
FIG. 7 is a flowchart illustrating a method of determining a weight value for each local area constituting first and second object contours in an image processing apparatus according to one or more exemplary embodiments.

FIG. 7 is a flowchart illustrating a method of determining weight values for local areas constituting first and second object contours in an image processing apparatus according to one or more exemplary embodiments.

Referring to FIG. 7, the image processing apparatus may calculate a degree of reliability of the first object contour automatically extracted by the algorithm based on the analysis result in step S640 (S710). Next, the image processing apparatus may determine a first weight value which is to be assigned to the first object contour based on the calculated degree of reliability of the first object contour (S720).

Specifically, the image processing apparatus may calculate degrees of reliability for local areas of the first object contour automatically extracted by the preset algorithm. In one or more exemplary embodiments, the image processing apparatus 100 may analyze the displayed image and calculate the degrees of reliability for the local areas constituting the first object contour according to distance differences between edge information for the local areas constituting the image and pixel position information for the local areas of the first object contour automatically extracted by the algorithm. For example, the image processing apparatus may calculate the degrees of reliability corresponding to the distance differences calculated for the local areas constituting the first object contour with reference to pre-stored levels of the degrees of reliability. That is, the level of the degree of reliability may be a level set according to the distance difference between the preset two pieces of information. The distance difference is large as the level of the degree of reliability is close to 0 (zero), while the distance difference is small as the level of the degree of reliability is close to 1. Therefore, a degree of reliability of a local area having a large distance difference among the local areas constituting the first object contour may be close to the level of 0 (zero) and a degree of reliability of a local area having a small distance difference is may be close to the level of 1.

In one or more exemplary embodiments, the image processing apparatus may calculate the degrees of reliability for the local areas constituting the first object contour by comparing color or brightness information of the local areas constituting the first object contour with color or brightness information of a periphery. For example, the image processing apparatus may pre-store the degrees of reliability having a level of from 0 (zero) to 1 according to a preset color or brightness difference. Therefore, the image processing apparatus may calculate the degrees of reliability corresponding to differences between the color or brightness for the local areas constituting the first object contour and the color or brightness of the periphery with reference to the pre-stored level of the degree of reliability. That is, a degree of reliability of a local area having a small color or brightness difference among the local areas constituting the first object contour may be close to the level of 0 (zero) and a degree of reliability of a local area having a large color or brightness difference may be close to the level of 1.

When the degrees of reliability for the local areas constituting the first object contour are calculated as described above, the image processing apparatus may determine first weight values, which are to be assigned to the local areas of the first object contour, to be proportional to the degrees of reliability calculated for the local areas of the first object contour. When at least one degree of reliability among the degrees of reliability calculated for the local areas constituting the first object contour is equal to or larger than a preset threshold value, the image processing apparatus may set a first weight value for a corresponding local area as a maximum value. As described above, for example, the level of the degree of reliability may be set in a range of from 0 (zero) to 1 and the preset threshold value may be set within the preset level of the degree of reliability. When the level of the degree of reliability is equal to or larger than the preset threshold value, the maximum value of the first weight value may be set to "1". When the level of the degree of reliability is set to 0.7 as the preset threshold value, the first weight for a local area, in which the level of the degree of reliability is equal to or larger than 0.7, among the local areas constituting the first object contour may be 1.

When the first weight values, which are to assigned to the local areas constituting the first object contour is set as described above, the image processing apparatus may determine second weight values, which are to be assigned to local areas of the second object contour based on the first weight values for the local areas previously set (S730). Here, the second weight values, which are to be assigned to the local areas of the second object contour, may be inversely proportional to the first weight values for the local areas of the first object contour. That is, as described above, a local area having a high first weight value among the local areas constituting the first object contour is an area having a high degree of reliability and thus it is necessary to a assign high weight value to a local area of the second object contour corresponding to the corresponding local area having the high degree of reliability.

That is, in FIG. 4(b), the degree of reliability of the first local area 421 among the local areas constituting the first object contour 420 may be very high and the degree of reliability of the second local area 422 may be very low. Therefore, the first weight value of the first local area 421 having the high degree of reliability may be 1 and the first weight value of the second local area 422 having a low degree of reliability may be 0 (zero). Meanwhile, in FIG. 4(c), the second weight values for the local areas constituting the second object contour 430 are inversely proportional to the first weight values for the local areas constituting the first object contour 420. Therefore, the second weight value of the first local area 431, which is related to the first local area 421 of the first object contour 420, among the local areas constituting the second object contour 430 may be 0 (zero) and the second weight value of the second local area 432, which is related to the second local area 422 of the first object contour, may be 1.

When the first and second weight values for the local areas constituting the first and second contours are assigned to the local areas constituting the first and second contours as described above, the image processing apparatus may extract a new object contour based on the first and second weight values assigned to the local areas of the first and second object contours.

Figure 8:
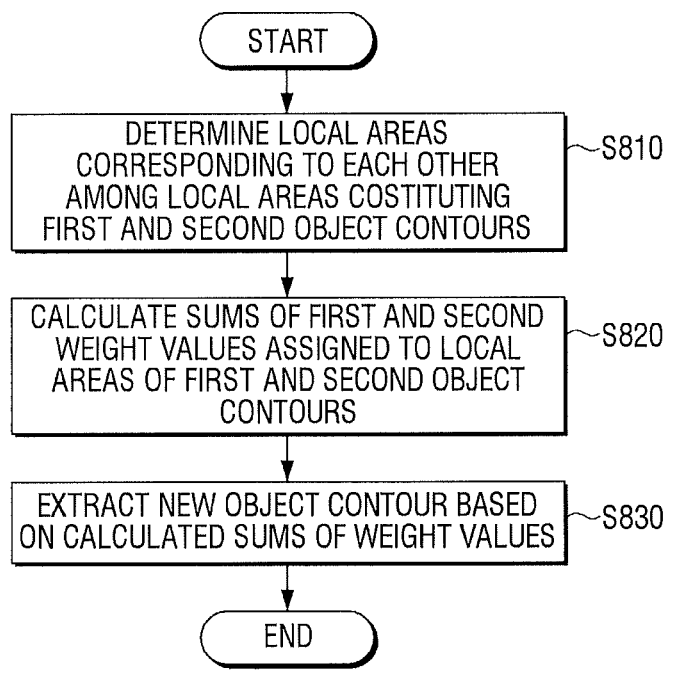
FIG. 8 is a flowchart illustrating a method of extracting a new object contour based on first and second object contours in an image processing apparatus according to one or more exemplary embodiments.

FIG. 8 is a flowchart illustrating a method of extracting a new object contour based on the first and second object contours in an image processing apparatus according to one or more exemplary embodiments.

Referring to FIG. 8, the image processing apparatus may determine local areas corresponding to each other among local areas constituting first and second object contours based on at least one of a pixel value and a position for each local area constituting the first object contour and at least one of a pixel value and a position for each local area constituting the second object contour (S810).

In one or more exemplary embodiments, the case in which the local areas corresponding to each other are determined based on the pixel values for the local areas constituting the first object contour and the local areas constituting the second object contour will be described. The image processing apparatus may acquire a first value on a mask area including an arbitrary feature point for a specific local area among the local areas constituting the first object contour. Next, the image processing apparatus may acquire second values on mask areas including arbitrary feature points for the local areas constituting the second object contour. Subsequently, the image processing apparatus may calculate differences between the first value for the specific local area of the first object contour and the second values of the local areas of the second object contour.

In some cases, the image processing apparatus may calculate the differences between the first value and the second values using a SAD algorithm. When the differences between the first value and the second values are calculated as described above, the image processing apparatus may determine a local area having the second value having the smallest difference with the first value among the local areas constituting the second object contour and the local area having the first value on the first object contour as the local areas corresponding to each other.

However, the inventive concept is not limited thereto and the image processing apparatus may determine a value on a mask area including an arbitrary feature point for a specific local area among the local areas constituting the second object contour as the first value and values on mask areas including arbitrary feature points for the local areas constituting the first object contour as the second values.

In one or more exemplary embodiments, the image processing apparatus may determine the local areas corresponding to each other based on the positions for local areas constituting the first object contour and local areas constituting the second object contour. First, the image processing apparatus may move an arbitrary feature point for each local area constituting the first object contour to each local area constituting the second object contour. At this time, the image processing apparatus may move the arbitrary feature points in a vertical direction. When the arbitrary feature points moved in the vertical direction reach corresponding points of the local areas constituting the second object contour, the image processing apparatus may determine a local area corresponding to a feature point having the smallest moving distance among the arbitrary feature points reached to the corresponding points of the local areas constituting the second object contour and a local area corresponding to a corresponding point met with the corresponding feature point as the local areas corresponding to each other.

However, the inventive concept is not limited thereto and the arbitrary feature points for the local areas constituting the second object contour may be moved to the local areas constituting the first object contour.

When the local areas corresponding to each other among the local areas constituting the first and second object contours are determined based on at least one of the pixel value and the position as described above, the image processing apparatus may calculate sums of the first and second weight values assigned to the local areas of the first and second object contours on the basis of the determined local area corresponding to each other (S820). The sums of the first and second weight values assigned to the local areas of the first and second object contours may be obtained through Equation 1 as described above. When the sums of the first and second weight values assigned to the local areas of the first and second object contours are calculated, the image processing apparatus may extract a new object contour based on the sums of the weight values of the local areas constituting the first and second object contours (S830).

Until now, the inventive concept has been described by focusing on the exemplary embodiments.

The foregoing exemplary embodiments and advantages are merely exemplary and are not to be construed as limiting the present inventive concept. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

In one or more embodiments, any apparatus, system, element, or interpretable unit descriptions herein include one or more hardware devices or hardware processing elements. For example, in one or more embodiments, any described apparatus, system, element, retriever, pre or post-processing elements, tracker, detector, encoder, decoder, etc., may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An image processing apparatus, comprising:
a receiver configured to receive an image;
a display configured to display the received image;
one or more hardware processors which provide:
an extractor configured to extract a first object contour by applying a preset algorithm to an area of the displayed image designated by a user and extract a second object contour based on the designated area;
an image analyzer configured to analyze the displayed image; and
a controller configured to determine a weight value for the first object contour and a weight value for the second object contour based on an analysis result of the image analyzer and extract an object contour based on the first object contour and the second object contour to which the determined weight value of the first object contour and the weight value for the second object contour are applied.

2. The image processing apparatus as claimed in claim 1, wherein the controller calculates a degree of reliability of the first object contour based on the analysis result of the image analyzer and determines a first weight value assigned to the first object contour and a second weight value assigned to the second object contour, based on the calculated degree of reliability.

3. The image processing apparatus as claimed in claim 2, wherein the controller calculates a plurality of degrees of reliability for a plurality of first local areas of the first object contour, determines a plurality of first local area weight values assigned to the plurality of local areas, respectively, to be proportional to the calculated degrees of reliability for the local areas, and determines the first weight value for a respective local area as a maximum value when a corresponding degree of reliability for the respective local area among the plurality of calculated degrees of reliability for the local areas is equal to or larger than a preset threshold value.

4. The image processing apparatus as claimed in claim 3, wherein the controller determines a plurality of second local area weight values assigned to the plurality of second local areas of the second object contour, respectively, based on the plurality of first weight values assigned to the plurality of local areas of the first object contour, and
wherein the plurality of second weight values for the plurality of second local areas of the second object contour are inversely proportional to the plurality of first weight values for the plurality of first local areas of the first object contour.

5. The image processing apparatus as claimed in claim 1, wherein the image analyzer detects at least one among color, brightness, an edge, and distributed information for each local area among a plurality of local areas constituting at least one of the displayed image and the first object contour, and
wherein the controller calculates the degrees of reliability for each local area among the plurality of local areas constituting the first object contour based on a result of the detection.

6. The image processing apparatus as claimed in claim 1, further comprising a user interface configured to receive a user command,
wherein the controller designates the area according to the user command received through the user interface.

7. The image processing apparatus as claimed in claim 1, wherein the controller determines a plurality of corresponding local areas corresponding to each other among a plurality of first local areas and a plurality of second local areas constituting the first object contour and the second object contour, respectively, based on at least one of a pixel value and a position for each local area among the plurality of first local areas and the plurality of second local areas constituting the first object contour and the second object contour, respectively.

8. The image processing apparatus as claimed in claim 7, wherein the determining the plurality of corresponding local areas comprises extracting the object contour using the following equation:

$$(x,y)_{OC} = (x,y)_{1OC} W(x,y)_{1OC} + (x,y)_{2OC} W(x,y)_{2OC}$$

wherein $(x,y)_{1OC}$ is a first local area of the first object contour, $W(x,y)_{1OC}$ is a first weight value which is assigned to the first local area, $(x,y)_{2OC}$ is a second local area of the second object contour, and $W(x,y)_{2OC}$ is a second weight value which is assigned to the second local area.

9. An image processing method which processes an image received in an image processing apparatus, the method comprising:
   displaying the received image;
   extracting, using at least one processor, a first object contour by applying a preset algorithm to an area of the displayed image designated by a user and extracting a second object contour based on the designated area;
   determining a weight value for the first object contour and a weight value for the second object contour based on an analysis result of the displayed image; and
   extracting an object contour based on the first object contour and the second object contour to which the determined weight value of the first object contour and the weight value for the second object contour are applied.

10. The image processing method as claimed in claim 9, wherein the determining includes:
    calculating a degree of reliability of the first object contour based on the analysis result; and
    determining a first weight value assigned to the first object contour, and a second weight value assigned to the second object contour, based on the calculated degree of reliability.

11. The image processing method as claimed in claim 10, wherein the determining includes:
    calculating a plurality of degrees of reliability for a plurality of first local areas of the first object contour;
    determining a plurality of first weight values assigned to the plurality of first local areas, respectively, to be proportional to the calculated degrees of reliability; and
    setting first weight value for a respective local area as a maximum value when a corresponding degree of reliability for the respective local area among the plurality of calculated degrees of reliability is equal to or larger than a preset threshold value.

12. The image processing method as claimed in claim 11, wherein the determining includes determining a plurality of second local area weight values assigned to the plurality of second local areas of the second object contour, respectively, based on the plurality of first weight values which are to be assigned to the local areas of the first object contour, and
    wherein the plurality of second weight values for the local areas of the second object contour are inversely proportional to the plurality of first weight values for the plurality of first local areas of the first object contour.

13. The image processing method as claimed in claim 9, wherein the determining includes:
    detecting at least one of color, brightness, an edge, and distributed information for each local area among a plurality of local areas constituting at least one of the displayed image and the first object contour; and
    calculating degrees of reliability for each local area among the plurality of local areas constituting the first object contour based on a result of the detection.

14. The image processing method as claimed in claim 9, further comprising:
    receiving a user command; and
    designating the area according to the received user command.

15. The image processing method as claimed in claim 9, wherein the extracting includes determining a plurality of corresponding local areas corresponding to each other among a plurality of first local areas and a plurality of second local areas constituting the first object contour and the second object contour, respectively, based on at least one of a pixel value and a position for each local area among the plurality of first local areas constituting the first object contour and at least one of a pixel value and a position for each local area among the plurality of second local areas constituting the second object contour.

16. The image processing method as claimed in claim 15, wherein the extracting includes extracting the object contour using the following equation:

$$(x,y)OC = (x,y)1OC \, W(x,y)1OC + (x,y)2OC \, W(x,y)2OC$$

wherein $(x,y)1OC$ is a first local area of the first object contour, $W(x,y)1OC$ is a first weight value which is assigned to the first local area, $(x,y)2OC$ is a second local area of the second object contour, and $W(x,y)2OC$ is a second weight value which is assigned to the second local area.

17. The image processing method as claimed in claim 9, wherein the determining includes:
    calculating a degree of reliability of the first object contour based on the analysis result; and
    determining a first weight value assigned to the first object contour, and a second weight value assigned to the second object contour, based on the calculated degree of reliability.

18. The image processing method as claimed in claim 9, wherein the determining includes:
    detecting at least one of color, brightness, an edge, and distributed information for each local area among a plurality of local areas constituting at least one of the displayed image and the first object contour; and
    calculating degrees of reliability for each local area among the plurality of local areas constituting the first object contour based on a result of the detection.

19. An image processing method which processes an image received in an image processing apparatus, the method comprising:
    extracting, using at least one processor, a first object contour a second object contour from the received image;
    determining a weight value for the first object contour and a weight value for the second object contour based on an analysis result of the received image; and
    extracting an object contour based on the first object contour and the second object contour to which the determined weight value of the first object contour and the weight value for the second object contour are applied.

20. The image processing method as claimed in claim 19, wherein the extracting includes determining a plurality of corresponding local areas corresponding to each other among a plurality of first local areas and a plurality of second local areas constituting the first object contour and the second object contour, respectively, based on at least one of a pixel value and a position for each local area among the plurality of first local areas and at least one of a pixel value and a position for each local area among the plurality of second local areas.

* * * * *